Patented Nov. 15, 1949

2,488,440

UNITED STATES PATENT OFFICE 2,488,440

TITANIUM DIOXIDE PIGMENT PRODUCTION

Holger Heinrich Schaumann, Newark, Del., assignor to E. I. du Pont de Nemours & Company, Wilmington, Del., a corporation of Delaware No Drawing. Application November 30, 1946, Serial No. 713,382

13 Claims. (Cl. 23—202)

This invention relates to titanium oxide pigment production and to novel methods for obtaining such product. More particularly, it relates to $TiO_2$ pigment production by the gas phase oxidation under controlled conditions of titanium tetrachloride.

The preparation of titanium dioxide through reaction of titanium tetrachloride in the vapor phase with an oxygen-containing gas or by a socalled steam-splitting reaction is already known. However, such prior methods lack technical importance and are not adaptable to nor feasible for commercial exploitation due to the fact that they entail a very difficult, costly and discontinuous type of operation and produce a titanium dioxide product which is decidedly lacking in essential pigment properties, e. g., exhibits such poor tinting strength and coarse, non-uniform particle size distribution that it fails to meet the stringent requirements demanded by the $TiO_2$ pigment trade. Also, control over the crystalline form of the titanium dioxide produced from such procedures cannot be effected, and such large excesses of oxygen are required to convert the tetrachloride that contamination of the gaseous chlorine simultaneously formed with the $TiO_2$ takes place to render the chlorine unfit for reuse.

In my copending application Serial No. 653,428, filed March 9, 1946, novel and highly useful methods are disclosed for remedying the above and other disadvantages of prior vapor phase oxidation methods for $TiO_2$ preparation, as well as for producing a high quality titanium oxide pigment through vapor phase oxidation in the presence of regulated small amounts of water vapor of titanium tetrachloride, said product being characterized by controlled uniform particle size, color, tinting strength, opacity, and hiding power, etc., and being either in pigment-useful rutile or anatase crystalline form.

I have now discovered that if the water constituent present in the controlled oxidation reaction of my said copending application is generated in situ by means of hydrogen present during the reaction, quite unexpectedly an improved type of $TiO_2$ product, with an accompanying, more efficient control over said reaction, results. It is accordingly among the objects of this invention to effect production of an improved, pigment-quality titanium dioxide, in either the rutile or anatase crystalline form through the decomposition of titanium tetrachloride by controlled oxidation in the vapor phase and in the presence of sufficient hydrogen or a hydrogen-containing gas to generate requisite, small amounts of water vapor in situ in the oxidation reaction.

In a more specific and preferred embodiment, the invention comprises producing pigment-quality $TiO_2$, more especially rutile, by reacting in the vapor phase at an elevated temperature and over a controlled time period relatively pure titanium tetrachloride with an oxygen-containing gas, and effecting said reaction in the presence of sufficient hydrogen to continuously form in situ in the reaction from 0.1% to 5% by volume (based on the total volume of gases) of water vapor.

In producing a rutile pigment in accordance with one preferred adaptation of the invention, sufficient pure, vaporized, anhydrous titanium tetrachloride, an oxygen-containing gas, such as air, and from 0.0062 to 0.186 mol of hydrogen per mol of $TiCl_4$ (to form from .1%–3% of water vapor by volume) are separately and continuously introduced into a suitable oxidation zone to be rapidly and thoroughly admixed and completely reacted therein at a substantially constant temperature ranging from 900–1200° C. Prior to introduction, either or all of said gaseous reactants are preheated to a temperature sufficient to provide on their admixture and reaction a temperature within the range mentioned. Any conventional corrosion-resistant type of reaction vessel can be employed in the process, which is of such design, construction and dimension that a continuous flow of the reactants and products within and through its oxidation chamber will be afforded and such control over the velocities, mixing rates, temperatures and retention times will be permitted that, on the average, the reactants and resulting products will remain in such chamber for but a limited, relatively short period of time, e. g., long enough to effect a substantially complete reaction but insufficiently long to result in an undesired $TiO_2$ particle size growth. Usually, with a retention time of from about .1 to 1 second, using the indicated temperatures, substantially complete conversion of the titanium tetrachloride to titanium dioxide takes place.

The gaseous reaction products containing the $TiO_2$ product in suspension, upon discharge from the oxidation chamber are quickly cooled, through suitable quenching, or otherwise, so as to reduce their temperature to below 600° C. and in order to prevent undesired growth from taking place through cementation or sintering of loosely-bound $TiO_2$ aggregates. One useful and effective method for accomplishing such rapid cooling comprises the recirculation of cooled product gases from the system for direct commingling with the gaseous TiO$_2$ suspension as it issues from the oxidation chamber. The quantity of cooled products employed in such instance should be sufficient to drop the temperature of the pigment suspension preferably to below 600° C. in about 1 second and not to exceed 10 seconds' time. Recovery of the rutile TiO$_2$ pigment from the cooled gaseous products of reaction can be suitably effected by means of conventional separatory treatments, including cyclonic or electrostatic separation, filtration through porous media, or the like. The resulting pigment will have an average particle size radius ranging from .05 to .5 micron, and preferably will range in average particle size radius from .1 to .25 micron. Such uniformity and small particle size, with the inherently high tinting strength, color, opacity, and other essential pigment properties exhibited by the product renders it useful in all types of pigment application, including paints, enamels, finishes and other types of coating compositions, as a delusterer for rayon or other artificial fibers or silks, in printing inks, rubber, etc.

To a clearer understanding of the invention, the following specific examples are given. These are merely illustrative and are not intended to limit the scope of the invention:

*Example I*

Titanium dioxide was prepared by the oxidation of vaporized titanium tetrachloride in a corrosion-resistant apparatus having a reaction chamber provided with three inlet tubes leading to said chamber and located adjacent to each other. These tubes passed through an oven heated to 1050° C. so that the gases prior to entering the reaction chamber were separately preheated. The titanium tetrachloride was admitted through one tube at the rate of 5200 grams per hour while simultaneously therewith air was admitted through a second tube at the rate of 3400 liters per hour and hyrogen was admitted through the third and much smaller tube at the rate of 38 liters per hour (3.5 parts by weight of hydrogen per 1000 parts of weight of oxygen). The temperature within the reaction chamber was found to be 1080° C. and the dimensions of the chamber were such that the retention time of the reactants therein was found by calculation to be .51 second. The titanium dioxide product was collected and after treatment to remove absorbed chlorine was found to have tinting strength of 198, a color of 19:2$y$, and a particle size radius of .17 micron. X-ray examination showed the product to be 100% rutile.

The above reaction was repeated excepted that hydrogen gas was omitted. The titanium tetrachloride vapor was heated to the same temperature and added at the rate of 5500 grams per hour. Simultaneously, air was admitted to the system through the preheater at the rate of 3400 liters per hour, this constituting approximately 10% excess oxygen over the theoretical requirement. The resulting titanium dioxide product had a tinting strength below 50, and was composed of large anatase crystals, non-useful as a pigment.

In another comparable operation, utilizing equivalent rates, temperatures, and concentrations, except that air humidified with sufficient water vapor to provide a .95% H$_2$O content by volume was employed in lieu of the above air and hydrogen reactants, resulted in a TiO$_2$ product which, although in the rutile form, had a tinting strength of 180, a color of 16:4$y$, and a particle size radius of .18 micron.

*Example II*

Titanium tetrachloride at the rate of 5330 grams per hour was passed into the apparatus described in Example I, where it was preheated to the temperature of 1070° C. Simultaneously, air was admitted thereto at the rate of 3400 liters per hour (being similarly preheated on its way to the reaction chamber), while methane was admitted through the third pipe at the rate of 52.6 liters per hour (equivalent to 9.4 grams H$_2$ per hour). A test of the gases leaving the reaction chamber showed that the oxidation was substantially complete and the product was found to be 95% rutile with a tinting strength of 190 and a color of 17:3$y$.

The pigment values given herein were determined in accordance with the methods described or referred to in U. S. Patents 2,253,551 and 2,046,054.

Although certain temperatures, concentrations, reactants, ratios, and retention times have been mentioned above as employable herein, it will be understood that these are not to be taken as critical and that variation therefrom may be had without departing from the underlying principles and scope of the invention. Thus, while air comprises a preferred type of oxygen-containing gas for use herein, other types and amounts of oxidizing gases containing free oxygen (O$_2$) can also be used, as can mixtures thereof. Examples of other useful gases include oxygen, oxygen-enriched air, or mixtures of oxygen or air with various inert gases. Similarly, while hydrogen, in an amount ranging from 2 to 5 parts H$_2$ per 1000 parts of O$_2$, is preferred for use, other hydrogenous gases which, under the conditions of the oxidation reaction, become oxidized to form water vapor, and other amounts thereof, can also be used. For example, gaseous hydrocarbons, such as methane, ethane, acetylene, ethylene or their derivatives, as well as gasified alcohols (ethyl, methyl, propyl, etc.), hydrogen halides (HCl, HBr, HI) and ammonia, can also be used, as can amounts of H$_2$ ranging from 0.5 to 10 parts H$_2$ per 1000 parts of O$_2$.

Again, while I prefer to introduce the required concentration of H$_2$ separately into the reaction zone, other methods of introduction can be resorted to, such as by introducing the hydrogenous gas with the TiCl$_4$ reactant.

As already indicated, a careful control must be exercised over the amount of H$_2$ gases used in the invention because the resulting concentration of water vapor is a critical factor in the invention and particularly in controlling the quality of the ultimate pigment product. If too much water vapor is produced, the operation becomes commercially impractical because chlorine becomes lost as HCl and the TiO$_2$ product will lack requisite pigment grade particle size characteristics. If the quantity is too small, the disadvantages of prior methods accrue. Preferably, an amount of hydrogenous gas sufficient to provide on oxidation an amount of in situ-formed water vapor ranging from .1–3% is used, with an amount sufficient to provide from .05% to 5%, but not exceeding 10% H$_2$O (based on the total volume of gaseous reactants being fed to the reaction zone) being generally contemplated as utilizable.

As stated, reaction zone temperatures ranging from 900–1200° C. are preferred for use since optimum benefits hereunder have been found to accrue as a result. However, higher or lower temperatures, say, from 800° C. to 1350° C., can also be employed, depending upon the reactants, rates of addition thereof, type of apparatus used, and retention times of reactants which are resorted to. These temperatures can be readily obtained in a large scale or commercial type of operation by separately preheating each reactant to an extent sufficient to insure on their admixture and reaction a temperature within the order specified, and can be maintained either by means of the heat generated from the oxidation reaction or through external heating of the reaction zone or vessel, or both, whichever is preferred. The temperatures mentioned above comprise those measured by a thermocouple extending through the walls of the reaction vessel and into the reacting gases.

Preheating the reactants can be effected by separately subjecting each to an equivalent heating temperature, or, if desired, the oxidizing and hydrogenous gas may be preheated to temperatures above or below those to which the tetrachloride is subjected. Any conventional preheating equipment can be used for the purpose, including any suitable type of electrical resistance apparatus or devices adapted to pass the reactants in direct or indirect heat exchange relationship with a heat-imparting medium. A useful type of heating apparatus comprises one in which the reactants pass over heat transfer surfaces heated directly by combustion of fuels or indirectly by circulation of a suitable heat transfer medium.

Normally, the titanium tetrachloride oxidation is effected under atmospheric pressures, but, if desired, it may be carried out under super or subatmospheric pressures. Similarly, any type or size of reaction vessel conforming to the scale of operation intended can be used in the invention, with equipment of a design and dimension such as will permit a continuous flow of reactants through the reaction vessel, especially its oxidation chamber, being preferred, so that a continuous, as distinguished from a discontinuous or batch, type of operation, will be had. While a continuous type of process is preferred, the process can also be carried out as a batch or semi-continuous type of operation.

The time of retention of reactants within the reaction zone is quite important and critical in the invention, especially in the production of pigment-quality $TiO_2$, as herein defined. In general, such retention time must not exceed about 5 seconds nor be less than about .01 of a second. A preferred time, to obtain an optimum quality pigment, ranges from .1 to 1 second.

As already noted, pigment-quality anatase or rutile $TiO_2$ pigments, as well as mixtures thereof, can be produced under the invention. In producing rutile of optimum pigment qualities, it is usually desirable to operate the $TiCl_4$ oxidation reaction under such combination of conditions that there will be employed (a) a minimum moisture concentration in the reacting gases to insure formation of rutile crystal structure $TiO_2$ pigment; (b) minimum preheating temperatures for the reactants and thorough, rapid mixing of such reactants; (c) minimum retention time of reactants and products in the oxidation chamber sufficient only to effect substantially complete conversion of the $TiCl_4$ to $TiO_2$ and growth of the $TiO_2$ pigment particles to the desired size; and (d) quick cooling of the products from the oxidation after formation of the desired particle size $TiO_2$, whereby overgrowth of the pigment particles will be prevented.

These variables are interdependent and optimum values, within the limits specified, for moisture content in the reacting gases, preheating and reaction zone temperatures and retention time in the oxidation chamber must be predetermined for a particular apparatus to obtain the desired particle size rutile pigment. The preferred relationship between these critical variables is, as already stated, dependent upon such factors as manner and speed of mixing of the reactants, size and shape of the oxidation chamber, etc., as well as upon the particle size desired in the pigment $TiO_2$.

It has been found, as already indicated, that the temperature to which the reactants are subjected in the preheating operation has an important bearing upon the ultimate type, crystallinity, and character of the $TiO_2$ pigment. In producing anatase, it is usually desirable to employ lower preheating temperatures with resulting lower reaction chamber temperatures than are resorted to and necessary in the production of rutile. The preferred, most useful temperature will depend upon such factors as the scale of the involved operation, the size and shape of the reaction chamber, and the rapidity with which gas mixing is effected. In producing rutile, preheating temperatures adequate to insure a mixed gas temperature of at least 350° C., and preferably above 400° C., are usually necessary, while in anatase production preheating temperatures sufficient to afford a mixed gas temperature ranging from below 350° C. to not lower than 100° C. can be resorted to. While a preheating temperature of at least 350° C. is suggested in rutile production, in general, and as already indicated, it will be found that as the size of a given operation increases, the amount or degree of preheating temperature required to effect such rutile production decreases. Hence, temperatures below those recommended and to as low as, say, 250° C., are contemplated as useful.

The titanium tetrachloride reactant preferred for use herein comprises a high-purity material to insure production of a product exhibiting exceptionally high pigment whiteness and brightness characteristics. This reactant can be obtained from any convenient source, as for instance through the chlorination of a titaniferous ore, such as ilmenite, followed by purification through careful fractional distillation to obtain the desired product. Examples of other utilizable titanium tetrachloride reactants comprise the pure, anhydrous titanium tetrachloride (freed of copper, vanadium, iron, and other impurities) contemplated in U. S. Patent 2,062,133, or the product which results from soya bean oil treatment disclosed in U. S. Patent 2,230,538.

Although chemically-equivalent concentrations of reactants are used herein and substantially complete conversion of the chloride to $TiO_2$ obtained as a result, in general I prefer to operate with amounts of oxidizing gas sufficient to provide about 10% excess oxygen over the theoretical so as to obtain a product gas containing about 30% $Cl_2$ by volume, when air is used as the source of oxygen, and 90–95% $Cl_2$ when gaseous oxygen is employed, with but small or minor amounts of $O_2$ and HCl. The use of oxygen-enriched air will produce chlorine concentrations intermediate between 30 and 90% $Cl_2$ gas in the oxidation products. However, the invention is not limited thereto, since it is susceptible of operation using either excess or deficient concentrations of the oxidizing or titanium tetrachloride reactant. In event an excess of the chloride is used, it can be separated from the oxidation products and reused in the system. Occasionally it may be desirable to operate the process with incomplete titanium tetrachloride conversion and such type of operation is likewise contemplated within the scope of the invention. Satisfactory titanium dioxide pigments have been produced hereunder with tetrachloride conversions as low as 50% of theoretical.

As already noted, in the commercial application of the invention any chlorine produced simultaneously with the titanium dioxide pigment can be conveniently recycled to produce more titanium chloride for oxidation. Thus, a continuous, as distinguished from a non-continuous, type of operation is afforded. The gaseous chlorine formed may be recycled directly from the pigment recovery operation or, if desired, may be concentrated prior to reuse in the chlorination operation. Such by-product chlorine can also be used for purposes other than chlorinating titaniferous materials, if that should be desired.

The products of reaction are most conveniently subjected to quick, rapid cooling by the recirculation of sufficient cooled product gases to instantaneously drop the temperature of the pigment suspension issuing from the reaction zone well below 800° C., and preferably below 600° C. Such cooling should be effected in less than 30, and preferably in less than 10, seconds' time. Other means for accomplishing cooling can be resorted to, such as quick quenching by spraying liquid chlorine into the oxidation products; impingement of the gaseous suspension on cold surfaces; rapid flow through cooled tubes, etc. Similarly, quenching with other gases, such as air, or with liquids other than chlorine, can also be resorted to. The latter methods are less practical and hence are not preferred because undesired dilution may occur of the chlorine content of the gaseous products.

The precise manner by which the use and in situ-formation of the contemplated amounts of water vapor during the reaction induce production of the improved form of high-quality $TiO_2$ pigment obtainable hereunder is presently not clearly understood. As disclosed in my aforesaid copending application, under the controlled and regulated conditions of the reaction which prevail, the presence of water vapor in the reaction zone forms extremely minute $TiO_2$ crystallites which are well dispersed throughout the gaseous mixture according to the reaction:

$$TiCl_4 + 2H_2O \rightarrow TiO_2 + 4HCl$$

Control over the size, crystalline form, and number of these nucleating particles is effected by the amount of water present during the oxidation reaction and the temperature conditions under which they are permitted to form. Under the prevailing, controlled reaction conditions, nuclear $TiO_2$ or oxychloride particles of such minute size, number and type continuously form in the reaction chamber to provide throughout the titanium tetrachloride oxidation a continuous, fresh supply of seeding material onto which the $TiO_2$ from such oxidation precipitates and builds up or grows into $TiO_2$ particles of desired pigment dimension, uniformity and crystalline structure. Low temperatures favor the formation of anatase nuclei while high temperatures promote rutile formation, and the nucleating particles function as "centers" for subsequent growth by $TiO_2$ deposition in the same crystalline form as the "centers" by the oxidation reaction:

$$TiCl_4 + O_2 \rightarrow TiO_2 + 2Cl_2$$

The average final particle size is then an inverse function of the number of nuclei, and the crystal variety (rutile or anatase) is determined by the type of seed crystallite formed in the first stages of the reaction. By forming the requisite concentration of water vapor in situ of the oxidation reaction, the reaction between $TiCl_4$ and $H_2O$ vapor to form nucleating particles is momentarily delayed since it is first necessary for the hydrogen to react with the oxygen-containing gas to form water vapor before reaction between $TiCl_4$ and $H_2O$ can occur. Thus, water vapor is not present in appreciable amounts at the reactant inlets and consequently the tendency for reaction of $TiCl_4$ with oxygen or water vapor is decreased at the inlets and deposition of $TiO_2$ thereon is minimized.

The terms "pigment quality" or "essential pigment properties," as used herein and in the appended claims, mean a $TiO_2$ product possessing satisfactory color, tinting strength, texture, particle size, and other requisite pigment properties rendering it commercially useful for coating compositions, such as paints, enamels, varnishes, finishes, etc., for pigmenting paper, linoleum, etc., and for the production of shoe cleaner preparations or as a delusterant for artificial silks, nylon, etc. Such titanium dioxide is considered as being at least substantially equal to the quality obtained from a titanium sulphate process used in the production of either commercial anatase or rutile. An additionally important property, quite significant in the manufacture of a rutile pigment, is the carbon black undertone of the product. The effect of the addition of carbon black to a white paint is found to vary considerably and in some cases a gray or bluish undertone is produced, while in other instances a gray or reddish undertone results. Paints may be identical in content of the carbon black and white pigment such as titanium dioxide, but yet appear quite different to the eye, due to the difference in undertone. This is considered as due to a difference in particle size and/or particle structure. The bluish undertone appears to be characteristic of pigments of small particle size, while the reddish undertone is characteristic of pigments of larger and less uniform particle size, although the structure of the pigment particle may also exert an influence. In order to give numerical gradings or values to this property, an arbitrary scale has been set up by assigning a grading of zero to a commercial pigment produced by the process of U. S. Patent 2,253,551, which shows excellent durability in outside house paints and other exterior coating compositions, but is relatively large in particle size and exhibits a reddish undertone. Another pigment produced in accordance with the process of U. S. Patent 2,224,987, having a relatively small particle size and exhibiting a bluish undertone, was given a rating of 100. These pigments serve as the basis for an arbitrary scale for rating by comparison the pigments produced by the present invention. The paint trade in general desires the pigment of bluish undertone, i. e., pigments rated in the upper part of the range or having numerical gradings in excess of about 50. It is obvious that some pigments may be graded over 100 if they are more blue in undertone than the based pigment rated 100.

The carbon black undertones of pigments best suited for optimum durability in exterior paints are in general rated low and are found to have ratings in the lower half of the indicated range. Such pigments are more chalk-resistant and therefore desired even though a sacrifice in pigment properties, such as tinting strength and hiding power, due to a growth in particle size, may have resulted. These superior pigments are adapted to exterior use and may be rated low in some pigment properties in order to provide the desired durability but would not be desired for consumption in the manufacture of the highest quality interior finishes. It therefore follows that the optimum pigment properties for a given pigment depend, in some measure, on the type of application in which it is to be used.

I claim as my invention:

1. A process for producing a titanium oxide pigment comprising reacting titanium tetrachloride in the vapor phase at an elevated temperature of at least 800° C. with an oxygen-containing gas, effecting said reaction over a time period ranging from .01 to 5 seconds and in the presence of small amounts of water vapor ranging from .05% to 10% by volume, based on the total volume of gases being reacted and generated in situ with the reactants, and recovering the resulting $TiO_2$ pigment.

2. A process for obtaining a titanium oxide pigment having an average particle size radius ranging from .05 to .5 micron and on X-ray analysis exhibiting the diffraction pattern of rutile, comprising reacting in the vapor phase over a time period ranging from .01 to 5 seconds and at a temperature of at least 800°C., titanium tetrachloride and an oxygen-containing gas in the presence of a hydrogenous gaseous substance which during the reaction oxidizes to form small amounts ranging from .05% to 10% by volume, based on the total volume of gases being reacted, of water vapor, and recovering the resulting rutile $TiO_2$ pigment.

3. A process for producing a titanium oxide pigment which comprises reacting titanium tetrachloride and an oxygen-containing gas in the vapor phase and at temperatures ranging from 800-1350° C., effecting said reaction within a time period ranging from .01 to 5 seconds and in the presence of sufficient hydrogen to form in situ with the reactants an amount of water vapor ranging from .05% to 10% by volume, based on the total volume of gases being reacted, and recovering the resulting $TiO_2$ pigment from the reaction products.

4. A process for producing pigment-quality titanium oxide which comprises reacting titanium tetrachloride and an oxygen-containing gas in the vapor phase and at temperatures ranging from 900-1200° C., effecting said reaction over a time period ranging from .01 to 5 seconds and in the presence of sufficient hydrogen to form in situ with the reactants an amount of water vapor ranging from .1% to 5% by volume, based on the total volume of gases being reacted, and recovering the resulting $TiO_2$ pigment from the products of reaction.

5. A continuous process for producing pigment-quality titanium oxide which comprises reacting titanium tetrachloride with an oxygen-containing gas in the vapor phase and in a reaction zone maintained at temperatures ranging from 900-1200° C., effecting said reaction over a period of time ranging from .1 to 1 second, and in the presence of sufficient hydrogen to form in situ with the reactants an amount of water vapor ranging from 0.1% to 3% by volume, based on the total volume of gases being reacted, and recovering the resulting $TiO_2$ pigment from the products of reaction.

6. A process for obtaining a titanium oxide pigment by reacting in the vapor phase titanium tetrachloride with an oxygen-containing gas in the presence of a hydrogenous gas which will oxidize to form water, comprising initially separately preheating at least one of said reactants to a temperature adequate to provide a mixed gas temperature of at least 350° C. on their admixture, thereafter introducing said reactants into a reaction zone maintained at a temperature ranging from 800-1350° C. for reaction over a period of time ranging from .01 to 5 seconds, the amount of hydrogenous gas employed being sufficient to generate from .05% to 10% by volume, based on the total volume of gases being reacted, of water vapor in situ with the reactants, and recovering the resulting $TiO_2$ pigment from the products of reaction.

7. A process for producing pigment-quality rutile by the vapor phase reaction of titanium tetrachloride with an oxygen-containing gas in the presence of hydrogen, which comprises separately preheating the reactants to a temperature sufficient to insure on their admixture a mixed gas temperature of at least 350° C., thereafter separately introducing the reactants into a reaction zone for reaction at temperatures ranging from 900-1200° C. over a period of time from .1 to 1 second and utilizing a sufficient amount of hydrogen to generate during the oxidation reaction in said zone an amount of water vapor ranging from 0.05% to 10% by volume, based on the reactants, and recovering the resulting $TiO_2$ pigment from the products of reaction.

8. A process for producing a titanium oxide pigment by the vapor phase reaction of titanium tetrachloride with an oxygen-containing gas and in the presence of a hydrogenous compound which will oxidize to form water, comprising effecting said reaction over a period of from .01 to not to exceed 5 seconds, at temperatures ranging from 800-1350° C., and in the presence of a sufficient quantity of said hydrogenous compound to form in situ in the reaction from 0.05% to 10% of water vapor by volume based on the reactants, and removing the reaction products from the reaction zone before particle size growth of the $TiO_2$ reaction product progresses beyond a pigment size range.

9. A process for producing pigment-quality titanium oxide through a controlled vapor phase reaction of titanium tetrachloride with an oxygen-containing gas in the presence of hydrogen, comprising conducting said reaction at temperatures ranging from 900° C.–1200° C. in the presence of sufficient hydrogen to form in situ in the reaction from .1% to 5% by volume, based on the reactants, of water vapor, allowing the reactants to remain in the reaction zone for a period of from .1 to not to exceed 1 second, and then recovering the resulting $TiO_2$ pigment from the products of reaction.

10. A process for producing pigment-quality titanium oxide comprising reacting titanium tetrachloride in the vapor phase with an oxygen-containing gas at a temperature above 1000° C. and in the presence of sufficient hydrogen to form in situ in the reaction from 0.05% to 10% by volume, based on the reactants, of water vapor, allowing the reactants to remain in the reaction zone for a period of from .01 to not to exceed 5 seconds, and then quickly removing the products from said zone upon substantial completion of the reaction and before particle size growth of the TiO$_2$ product progresses outside a range of from .05–.5 micron average radius.

11. A process for producing pigment-quality titanium oxide comprising reacting titanium tetrachloride in the vapor phase with an oxygen-containing gas at a temperature above 1000° C. and in the presence of sufficient methane to form in situ in the reaction from 0.05% to 10% by volume, based on the reactants, of water vapor, allowing the reactants to remain in the reaction zone for a period of from .01 to not to exceed 5 seconds, and then quickly removing the products from said zone upon substantial completion of the reaction and before particle size growth of the TiO$_2$ product progresses outside a range of from .05–.5 micron average radius.

12. A process for producing pigment-quality titanium oxide comprising reacting titanium tetrachloride in the vapor phase with an oxygen-containing gas at a temperature above 1000° C. and in the presence of sufficient gaseous hydrocarbon compound to form in situ in the reaction from 0.05% to 10% by volume, based on the reactants, of water vapor, allowing the reactants to remain in the reaction zone for a period of from .01 to not to exceed 5 seconds, and then quickly removing the products from said zone upon substantial completion of the reaction and before particle size growth of the TiO$_2$ product progresses outside a range of from .05–.5 micron average radius.

13. A process for producing pigment-quality titanium oxide comprising reacting titanium tetrachloride in the vapor phase with an oxygen-containing gas at a temperature above 1000° C. and in the presence of sufficient acetylene to form in situ of the reaction from 0.05% to 10% by volume, based on the reactants, of water vapor, allowing the reactants to remain in the reaction zone for a period of from .01 to not to exceed 5 seconds, and then quickly removing the products from said zone upon substantial completion of the reaction and before particle size growth of the TiO$_2$ product progresses outside a range of from .05–.5 micron average radius.

HOLGER HEINRICH SCHAUMANN.

REFERENCES CITED

The following references are of record in the file of this patent:

UNITED STATES PATENTS

| Number | Name | Date |
|---|---|---|
| 1,816,388 | Mittasch | July 28, 1931 |
| 1,850,286 | Mittasch | Mar. 22, 1932 |